United States Patent
Takahashi

(10) Patent No.: US 6,683,967 B1
(45) Date of Patent: Jan. 27, 2004

(54) AREA EXTRACTION METHOD, ADDRESS AREA EXTRACTION METHOD, ADDRESS AREA EXTRACTION APPARATUS, AND IMAGE PROCESSING APPARATUS

(75) Inventor: Hiroyasu Takahashi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 09/638,116

(22) Filed: Aug. 14, 2000

(30) Foreign Application Priority Data

Oct. 6, 1999 (JP) .......................... 11-285176

(51) Int. Cl.[7] .............................. G06K 9/00
(52) U.S. Cl. ........................ 382/101; 382/180
(58) Field of Search ................. 382/101, 102, 382/174, 180

(56) References Cited

U.S. PATENT DOCUMENTS

| | | | | |
|---|---|---|---|---|
| 4,998,010 A | * | 3/1991 | Chandler et al. | 235/494 |
| 5,617,481 A | * | 4/1997 | Nakamura | 382/101 |
| 5,737,437 A | * | 4/1998 | Nakao et al. | 382/101 |
| 5,748,804 A | * | 5/1998 | Surka | 382/291 |
| 6,574,351 B1 | * | 6/2003 | Miyano | 382/101 |

FOREIGN PATENT DOCUMENTS

| EP | 0054439 A2 | 12/1981 | G06K/9/34 |
|---|---|---|---|
| JP | 7-265807 | 10/1995 | B07C/3/14 |

OTHER PUBLICATIONS

Wolf et al. "Fast Address Block Location on Handwritten and Machine Printed Mail–piece Images", IEEE Proceedings of the Fourth International Conference on Document Analysis and Recognition, Aug. 18–20, 1997, vol. 2, page(s): 753–757.*

* cited by examiner

Primary Examiner—Brian Werner
Assistant Examiner—Ryan J. Miller
(74) Attorney, Agent, or Firm—Louis P. Herzberg

(57) ABSTRACT

An image processing apparatus comprises: a binarization unit 12 for obtaining a binary image for the image entered by an image input unit 10; a connected component detector 14 for detecting the obtained connected components; a comparator 16 for comparing the size of the detected connected components with a predetermined threshold size; a mesh image forming unit 18 for dividing the image entered by the image input unit 10 into mesh images having a predetermined size; a corresponding mesh image detector 19 for detecting, from the mesh images, a mesh image that corresponds to a connected component that is determined by the comparator 16 to occupy a range within the threshold size; a specific area extraction unit 22 for extracting a specific area in accordance with the connection state of the corresponding mesh image that is detected; and an image recognition unit 23 for recognizing an image that is located in the extracted specific area.

9 Claims, 13 Drawing Sheets

AREA EXTRACTION METHOD, ADDRESS AREA EXTRACTION METHOD, ADDRESS AREA EXTRACTION APPARATUS, AND IMAGE PROCESSING APPARATUS

FIELD OF THE INVENTION

The present invention relates to an image processing apparatus used for an automatic mailing address reader, and in particular to an image processing apparatus that extracts specific areas, including mailing address areas.

BACKGROUND OF THE INVENTION

The postal service system daily processes a large amount of mail within a short period of time. When all mail was sorted visually and manually, the size of the work load borne by postal service employees was very large. To reduce this work load, mechanization, including automatic readers, has been introduced. This has led to the development of an advanced procedure whereby mail to be delivered is sorted by district. This way of handling mail has been successful in Japan because postal codes are entered in boxes provided for them on mailing matter; however, for overseas mail, for which no clearly defined spaces for postal code entries are provided, it is difficult to mechanically determine where postal codes are located on mailing matter. Moreover, since it is anticipated that the amount of overseas mail processed will continually increase, currently a demand exists for the continued development of present techniques to permit the immediate reading of address information, including postal codes, carried by mail, and for sorting the mail for delivery by districts.

Although there is a strong demand for the extraction of postal codes carried by mailing matter for which postal code entry areas are not defined, and for the reading of address information, it is difficult to use current techniques for these purposes. This is primarily because on the exterior surfaces of the various items that constitute the mail, not only are there areas provided for recipient addresses, but there may be other areas in which sender addresses are entered, areas in which advertising material is presented, and areas in which various patterns, such as drawings and photographs, are displayed. Further compounding the problem are the many ways in which entries are made, including the use of handwritten and mechanically printed characters, and of vertical and horizontal writing styles. As a result, in order to correctly separate postal codes and other address data from the various coexisting information entries carried by the mail, a very complicated process must be employed, such as one that provides for the examination of all external surfaces.

Of the conventional methods that are used to extract address information, techniques exist by which address areas and actual addresses can be identified and read. Included is a method whereby it is presumed that labels bearing printed addresses are attached to mail. For this method the reflection attributes of the labels, or the shadows thrown by the edges of the labels, are detected and the address areas are thereafter extracted. There is also a method whereby horizontal and vertical projections of the mail are obtained and are used to select probable address areas, in which zones containing high entry densities are defined as character rows. In addition, in Japanese Unexamined Patent Publication No. Hei 7-265807 a technique is disclosed to extract character rows, in which connected components that are near each other are joined together, and the character rows are later combined to define probable address areas.

The method that provides for the extraction, from accompanying entries, of address areas by presuming that printed address labels are attached to mail is definitely useless with the large volume of mail where addresses are printed directly on external surfaces. With the method selecting probable mailing address areas by defining as character rows zones having high entry densities, it is difficult to separate address areas from their background if the background contains a large amount of image data.

According to the technique disclosed in Japanese Unexamined Patent Publication No. Hei 7-265807, a complicated joining process is performed. Portions from which pixels are accumulated are detected by examining all pixels. This detailed examination is repeated for each portion involved. With this technique, logic operations are very difficult, processing speeds are reduced, and configurations are too complicated.

It is, therefore, one object of the present invention to avoid the use of a complicated process to combine pixels, and to quickly and precisely extract specific areas, such as address areas.

It is another object of the present invention to extract several probable address areas that are free of extraneous patterns and noise, and to considerably simplify the process that follows thereafter.

DESCRIPTION OF THE INVENTION

To achieve the above objects, according to the present invention, an area extraction method comprises the steps of: extracting connected components from an input image; comparing the sizes of the connected components with a predetermined threshold size, and extracting connected components occupying ranges within the predetermined threshold size; dividing the input image into segments and assuming that the segments are mesh images having a predetermined size, and setting to the ON state the mesh images that correspond to the connected components occupying ranges within the predetermined threshold size that is extracted; and extracting a specific area from the connectivity of the mesh images that are in the ON state.

It is preferable that the input image be an image of mail that includes an address area, and that a probable address area be extracted at the step for extracting the specific area, so that the address area can be precisely extracted from the mail image wherein various information coexists.

It is preferable that, at the step for extracting the connected components occupying ranges within the predetermined threshold size, the connected components occupying ranges within the predetermined threshold size be extracted by comparing the height and/or width of the connected components with a predetermined height and/or width of a character at an assumed address, so that the connected components, for example, can be detected with noise removed, and that more precise extraction of the address area can be performed. More specifically, if the height and/or width of the connected components is equal to or smaller than a first constant value (e.g., 30 points at a resolution for the compression of 4 lines/mm), it can be ascertained that the pertinent connected components occupy ranges within the threshold size. In addition, a threshold size can be designated while the heights and/or widths of the connected components consist of rectangular areas. Since such a threshold value is set, printed characters in the background that are not related to address characters can be eliminated, and thin lines, such as broken lines and the lines formed by the edges labels, can be disregarded.

Furthermore, it is preferable that the sizes of the mesh images that are segments of the input image be determined to occupy ranges having sizes equal to the sizes of large characters in the address that is assumed. Thus, the process can be simplified by focusing on the characters in a mailing address. For a range that is equal to the size of a large character, assuming a maximum 30 points, a square area of 24×24 points can be selected as a mesh image.

Further, at the step of setting the mesh images to the ON state, a mesh image that includes the center coordinates of the connected components occupying ranges within the predetermined threshold size is set to the ON state.

Furthermore, according to the present invention, a method for extracting an address area comprises the steps of: extracting connected components having a predetermined size from an input image that includes an address area; dividing the input image into small areas and assuming simplified quadrilateral areas of one point each; determining a corresponding quadrilateral area to which the extracted connected components belong; and extracting a probable address area from the pixel's connection state of the corresponding quadrilateral area to which it is determined the connected components belong.

It is preferable that, at the step of extracting a probable address area, a plurality of attributes be determined and a proposed address be extracted, so that the probable address area can be more precisely determined. Specifically, attributes, such as whether there are character strings that extend along two or more lines, whether a sufficient number of quadrilateral areas are present, whether characters are located close to the edge of an image, and whether the shape of character strings appear to be aline with one for an address, are combined for use.

It is preferable that, at the step of extracting a probable address area, a priority order be designated for the character strings by determining whether the shape of character strings resemble the one for an address. Thus, the actual address reading can be begun in accordance with assigned priorities, and as the process is terminated when the address has been read, an increase in the processing speed is thereby be enabled.

According to the present invention, an apparatus for extracting an address area comprises: a connected component extraction means for extracting connected components having a predetermined size from an input image that includes an address area; a quadrilateral area assumption means for dividing the input image into small areas and for assuming the existence of simplified quadrilateral areas of one point each; a corresponding quadrilateral area determination means for determining a corresponding quadrilateral area to which the connected components extracted by the connected component extraction means belong; and a probable address area extraction means for extracting a probable address area from the pixel's connection state of the quadrilateral area that is determined by the corresponding quadrilateral area determination means.

The connected component extraction means employs a block of 8-connected components arranged vertically, horizontally or obliquely, or a block of 4-connected components arranged vertically or horizontally, to extract connected components occupying ranges within a predetermined threshold size. The quadrilateral area assumption means may divide an input image into small areas having a predetermined size, or may dynamically determine the size of small areas, in accordance with the distribution condition of connected components, and assume quadrilateral areas. The quadrilateral areas may be square areas or rectangular areas having different lengths in the primary scanning direction and in the sub-scanning direction. The corresponding quadrilateral area determination means may determine, as a corresponding quadrilateral area, a quadrilateral area wherein the center portion of the connected component extracted by the connected component extraction means is present, or may determine, as a corresponding quadrilateral area, a quadrilateral area wherein connected components are even slightly overlapped.

It is preferable that the probable address area extraction means extract, as a probable address area, a quadrilateral area that at the least encloses a 4-connected component each arranged vertically and horizontally in the corresponding quadrilateral area, so that extraction of the address area can be very precisely performed. A quadrilateral area enclosing an 8-connected component each arranged vertically, horizontally and obliquely can also be defined as a probable address area.

According to the present invention, an image processing apparatus comprises: an image input unit for entering an image; a binarization unit for obtaining a binary image for the image entered by the image input unit; a connected component detector for detecting connected components obtained by the binarization unit; a comparator for comparing the size of the connected components detected by the connected component detector with a predetermined threshold size; a mesh image forming unit for dividing the image entered by the image input unit into mesh images having a predetermined size; a corresponding mesh image detector for detecting, from the mesh images formed by the mesh image forming unit, a mesh image that corresponds to a connected component that is determined by the comparator to occupy a range within the threshold size; a specific area extraction unit for extracting a specific area in accordance with the connection state of the corresponding mesh image that is detected by the corresponding mesh image detection unit; and an image recognition unit for recognizing an image that is located in the specific area extracted by the specific area extraction unit.

The image entered by the input unit is of mail, including an address, and the threshold size used by the comparator is determined in accordance with a size that is assumed for a character in the address.

Furthermore, it is preferable that the predetermined size for the mesh images is determined based on the size of an address. Therefore, an address area for mail can be extracted quickly and precisely, while taking into account the size of the characters used in the address.

In addition, the predetermined size used by the mesh image forming unit is determined based on the size of the connected components detected by the connected component detector. Thus, compared with the prior art, wherein a complicated joining process is performed for all the pixels, the logic operation is very simple and the processing speed is increased.

PREFERRED EMBODIMENT

The preferred embodiment of the present invention will now be described in detail, while referring to the accompanying drawings.

Figure 1:
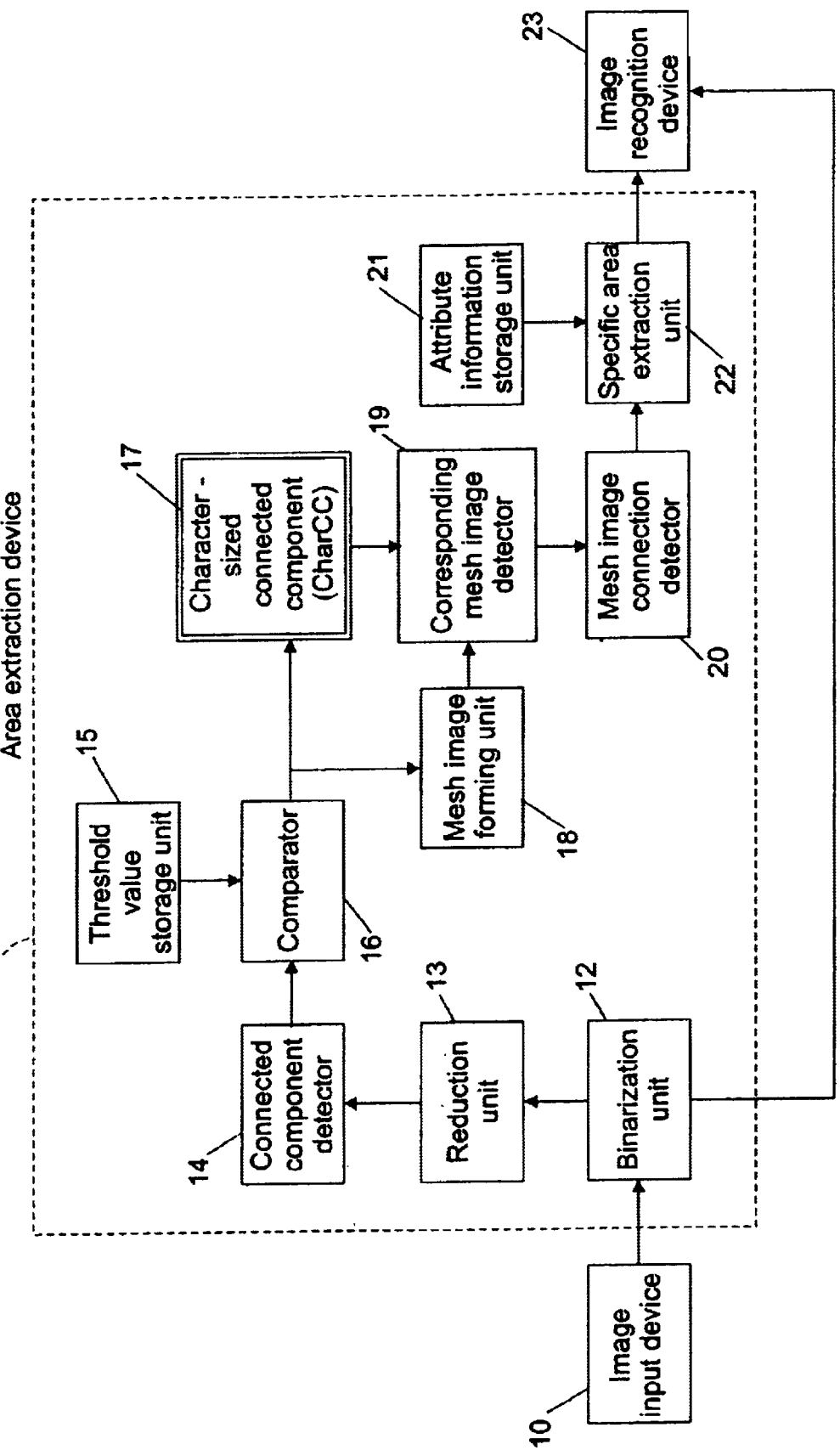
FIG. 1 is a diagram for explaining the overall arrangement of an image processing apparatus according to one embodiment of the present invention.

FIG. 1 is a diagram for explaining the overall arrangement of an image processing apparatus according to one embodiment of the present invention. As is shown in FIG. 1, the image processing apparatus in this embodiment mainly comprises an image input device 10, an area extraction device 11 and an image recognition device 23. The image input device 10 includes: a scanner, which has a line sensor in the primary scanning direction that it drives in the sub-scanning direction when reading an image; and an optical character reader, which employs photos to read an inclusive image, so that an image of the entire address bearing surface of a piece of mail can be obtained. The image input device 10 also includes a photoelectric converter (not shown) for converting an optical image signal into an electric signal.

The area extraction device 11 in this embodiment will now be explained. A binarization unit 12 converts an electric signal output by the image input device 10 into a binary signal for a white pixel and a black pixel; it also removes weak noise. It should be noted here that the image input device 10 may include binarization means, and may transmit an obtained binary signal to the area extraction device 11; in which case a binarization unit 12 is not required for the area extraction unit 11. A reduction unit 13 is also provided that compresses binary image data by converting images having a resolution of 8 lines/mm into images having a resolution of 4 lines/mm; a reduction process that is performed to increase the processing speed. An example reduction method that is used for this is one whereby continuous lines are employed for an AND operation, and the obtained result is output. However, since area extraction accuracy is deteriorated when this method is used, if the processing speed is satisfactory, the reduction unit 13 is not required. Further, the order in which the binarization unit 12 and the reduction unit 13 are arranged may be inverted.

The image data processed by the reduction unit 13 are transmitted to a connected component detector 14, which, in this embodiment, extracts from the binary image data all 8-connected components, i.e., connected components (connected components: CCs) consisting of 8-connected black pixels. An 8-connected component is extracted by capturing 8-connected pixels arranged horizontally, vertically or obliquely, relative to the center, and by extracting connectivity of black pixels. A method for the extraction of 4-connected components arranged vertically or horizontally can also be employed to detect connected components. However, since the oblique pixel connection arrangement is eliminated, it is preferable, while taking the oblique connection into account, that 8-connected components be commonly employed. Then, a threshold value is stored in a threshold value storage unit 15 to determine character size. And a comparator 16 compares connected components detected by the connected component detector 14 with the threshold value, and extracts a character-sized connected component (CharCC) 17, which is a connected component occupying a range within the limits set by the threshold value. In this case, a maximum constant value of 30, for example, is stored in the storage unit 15 as a condition for ensuring that the height/width of the connected component is smaller than a predetermined value. This value is provided to eliminate large printed patterns or long ruled lines on mail, and in accordance with this value, a connected component that exceeds 30 pixels, or about 8 mm at a resolution of 4 lines/mm, will not be accepted as a character-sized connected component (CharCC) 17. In addition, a value of 3 or longer for the short side of a rectangular area and a value of 8 or longer for the long side are stored as a condition that ensures the rectangular area (quadrilateral area) of a connected component exceeds a predetermined size. While taking into account the fact that thin lines can be noise, such as is produced by the edges of a label, and that broken lines must be eliminated, these values are so designated that a rectangular area 3×8 pixels or smaller is not considered a character-sized connected component (CharCC) 17.

The state of the character-sized connected component (CharCC) 17 determined by the comparator 16 is transmitted to a mesh image forming unit 18. The mesh image forming unit 18 divides an image into small areas and assumes the existence of simplified quadrilateral areas of one point each, i.e., forms so-called mesh images. According to this mesh division method, vertical and horizontal frequency distribution is obtained for received character-sized connected components (CharCCs) 17, and a mesh having an optimal size is determined. With this arrangement, a simplified quadrilateral area based on the character-sized entries that frequently appear on mail can be assumed, so that more precise area extraction can be performed. Instead of dynamic mesh division using the frequency distribution of the character-sized connected components (CharCCs) 17, a division size may be determined in advance. In this case, the size of a mesh can be determined as one that occupies a range equal to the size assumed for a large character in an address. For example, if the maximum character-sized connected component (CharCC) 17 consists of 30 pixels, quadrilateral areas consisting of small segments having predetermined sizes of 24×24 pixels can be employed to form meshes.

A corresponding mesh image detector 19 examines mesh images, which are quadrilateral areas assumed by the mesh image forming unit 18, to determine a mesh image to which a character-sized connected component (CharCC) 17, an extracted connected component occupying a range within the threshold value, belongs (or corresponds). The corresponding mesh image detector 19 then selects a corresponding quadrilateral area, and sets the mesh images to the ON state. The detection method can be a method for setting to the ON state a mesh image to which the center coordinates of an extracted character-sized connected component (CharCC) 17 belongs. There is also another method whereby, when a smaller mesh is assumed by the mesh image forming unit 18, a mesh image on which the rectangle of a character-sized connected component (CharCC) 17 is even partially superimposed is set to the ON state.

Upon receiving the output of a corresponding mesh image detector 19, a mesh image connection detector 20 detects the connection status of meshes that are in the ON state. At this time, assuming that mesh units that are vertically and horizontally sandwiched between meshes that are in the ON state are set to the ON state, these meshes are regarded as belonging to the same area, even though they are separated by a distance equivalent to one row. In addition, among the mesh images, vertical and horizontal connections of 4-connectivity, or vertical, horizontal and oblique connections of 8-connectivity (Connected Mesh: CM) are detected.

Upon receiving the results obtained by the mesh image connection detector 20, a specific area extraction unit 22 adds to the results attribute information obtained from an attribute information storage unit 21, and extracts a probable address area. Threshold value information is stored as a probable address area in the attribute information storage unit 21 in order to select an appropriate size for the address area. In addition, attribute information is stored to indicate whether there is a character string extending along two or more lines, whether the number of connected components (CCs) is adequate, or whether the shape of a character string has the appearance of an address. Since address information for mail is normally positioned near the center of an external surface, attribute information is also stored that indicates whether a pertinent area is nearer the edge or the center of an image representing the entire address bearing surface. The specific area extraction unit 22 employs the attribute information obtained from the attribute information storage unit 21 to provide an evaluation point for the connected mesh (CM) obtained by the mesh image connection detector 20, and extracts a specific area as a probable address area. As a result, the designation of probable address areas can be limited, and only a few locations output to the image recognition device 23 for the actual address identification processing. Therefore, the address reading accuracy can be considerably improved, and the address reading speed can be increased. The image recognition device 23, which is the post-processor for the area extraction device 11, receives a binary signal representing a complete image from the binarization unit 12 and area information from the specific area extraction unit 22, and employs these data to perform the reading of address areas in accordance, for example, with the descending order of their evaluation point rankings or priorities. When satisfactory results are obtained, the reading process is terminated.

As is described above, this embodiment employs a method for changing the pixel units to meshes that constitute areas having a predetermined size, and for simplifying the meshes by regarding each of them as a single point. Thus, compared with the conventional system, an address area can be quickly detected by using a simple algorithm. Furthermore, since character size or an address, the mesh connection condition, and the attribute information are taken into consideration when selecting an area, precise extraction of an area can be performed. In addition, since address reading is performed in accordance with the descending order of evaluation point rankings or priorities, the wasteful expenditure of resources for address reading is eliminated to the extent possible, and the efficient reading of addresses can be quickly performed.

Figure 2:
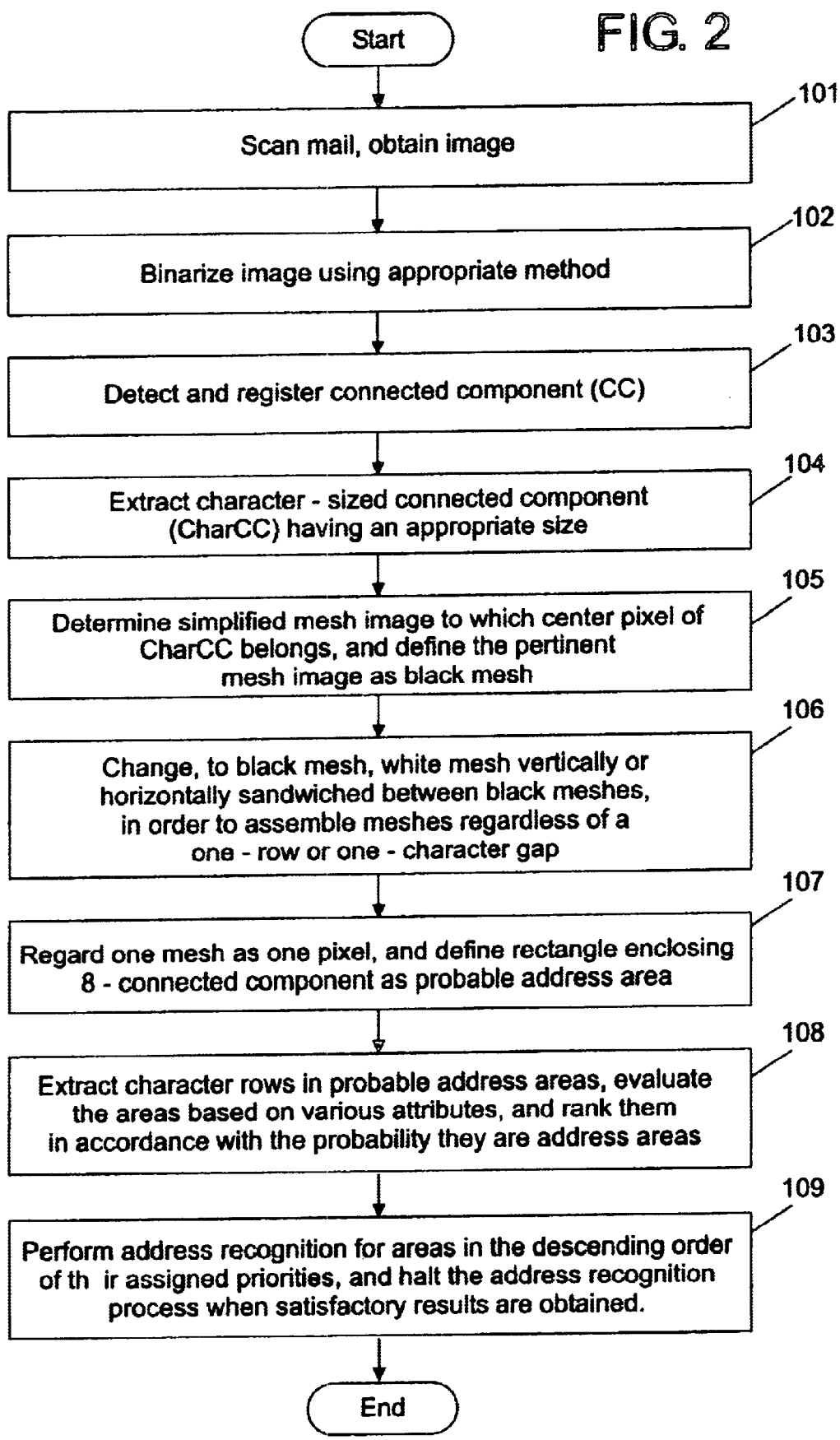
FIG. 2 is a flowchart for explaining the main processing performed to read a mailing address according to the embodiment of the present invention.
Figure 3:
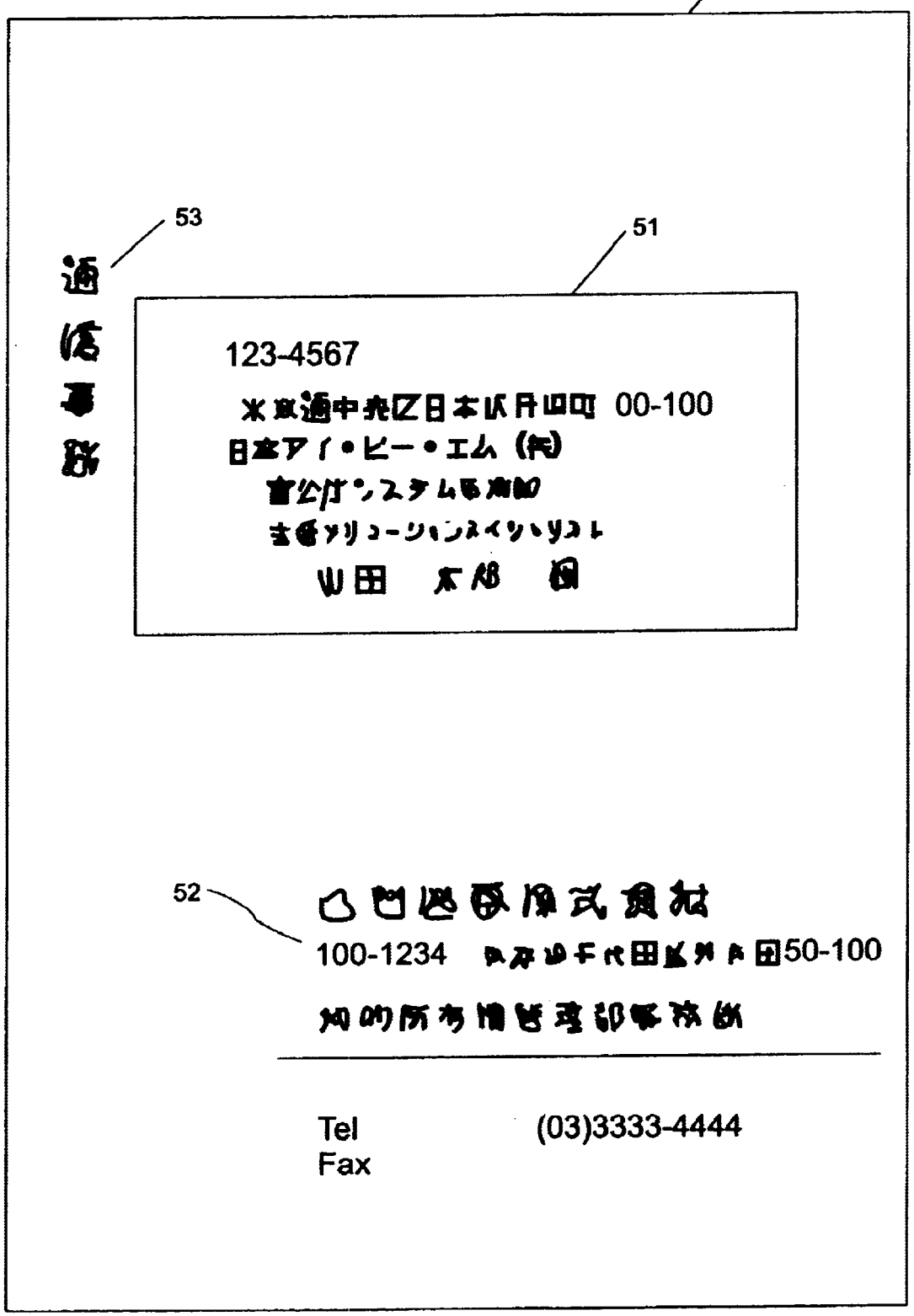
FIG. 3 is a diagram showing the original image for the first practical example.
Figure 4:
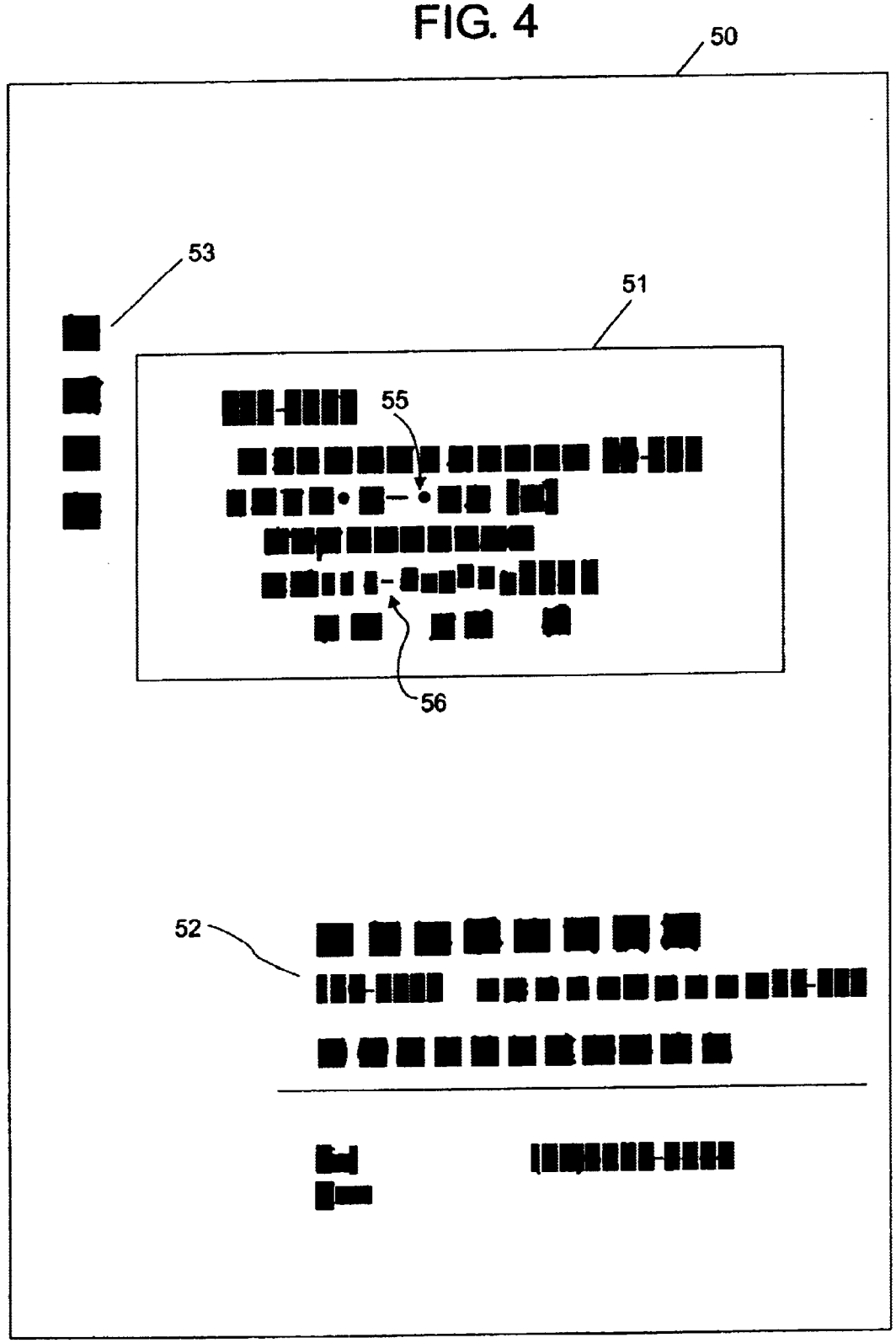
FIG. 4 is a diagram showing the existing state when character-sized connected components (CharCCs) in the first practical example are extracted.
Figure 5:
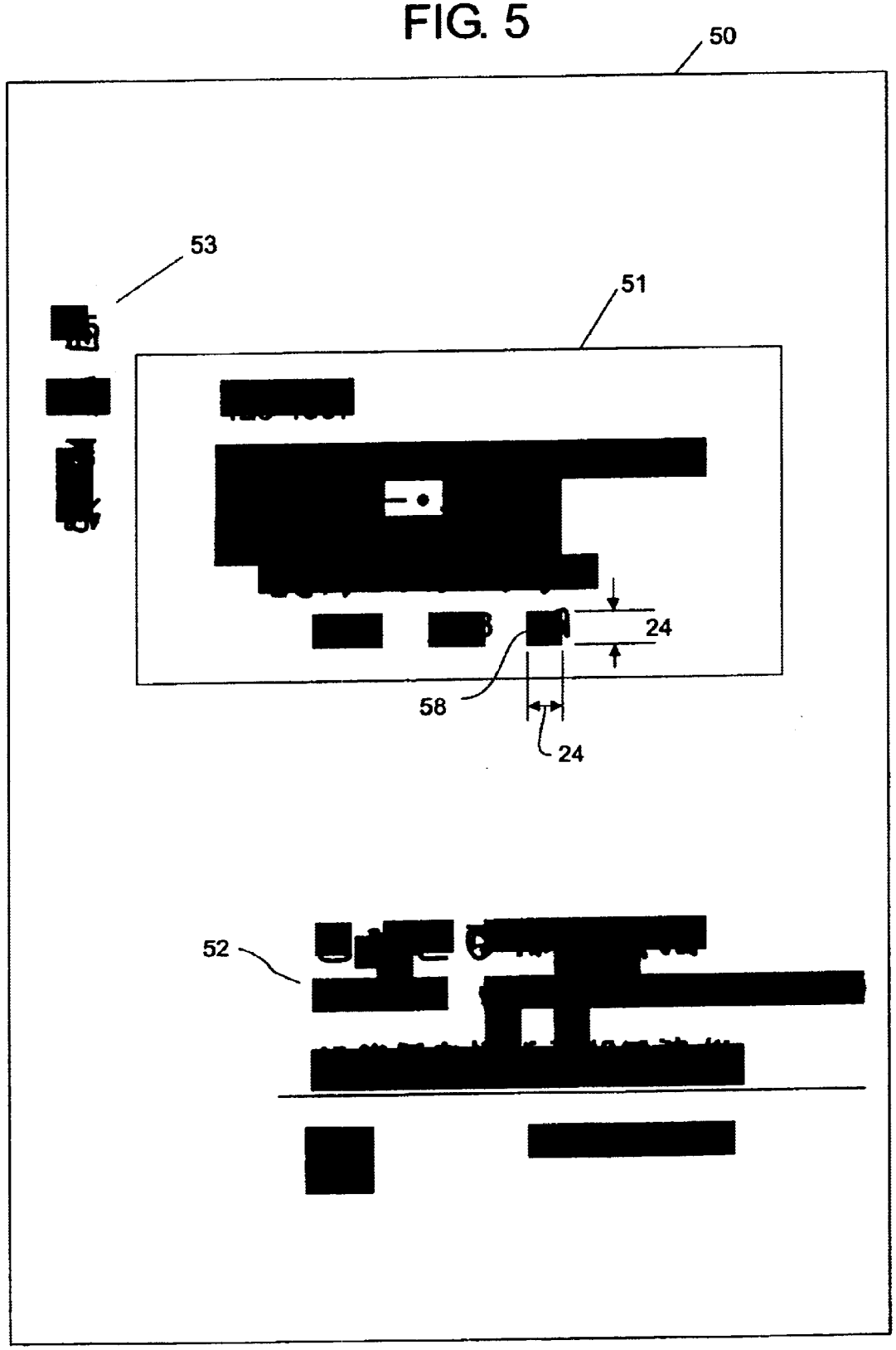
FIG. 5 is a diagram showing the existing state when mesh images in the first example are set to the ON state.
Figure 6:
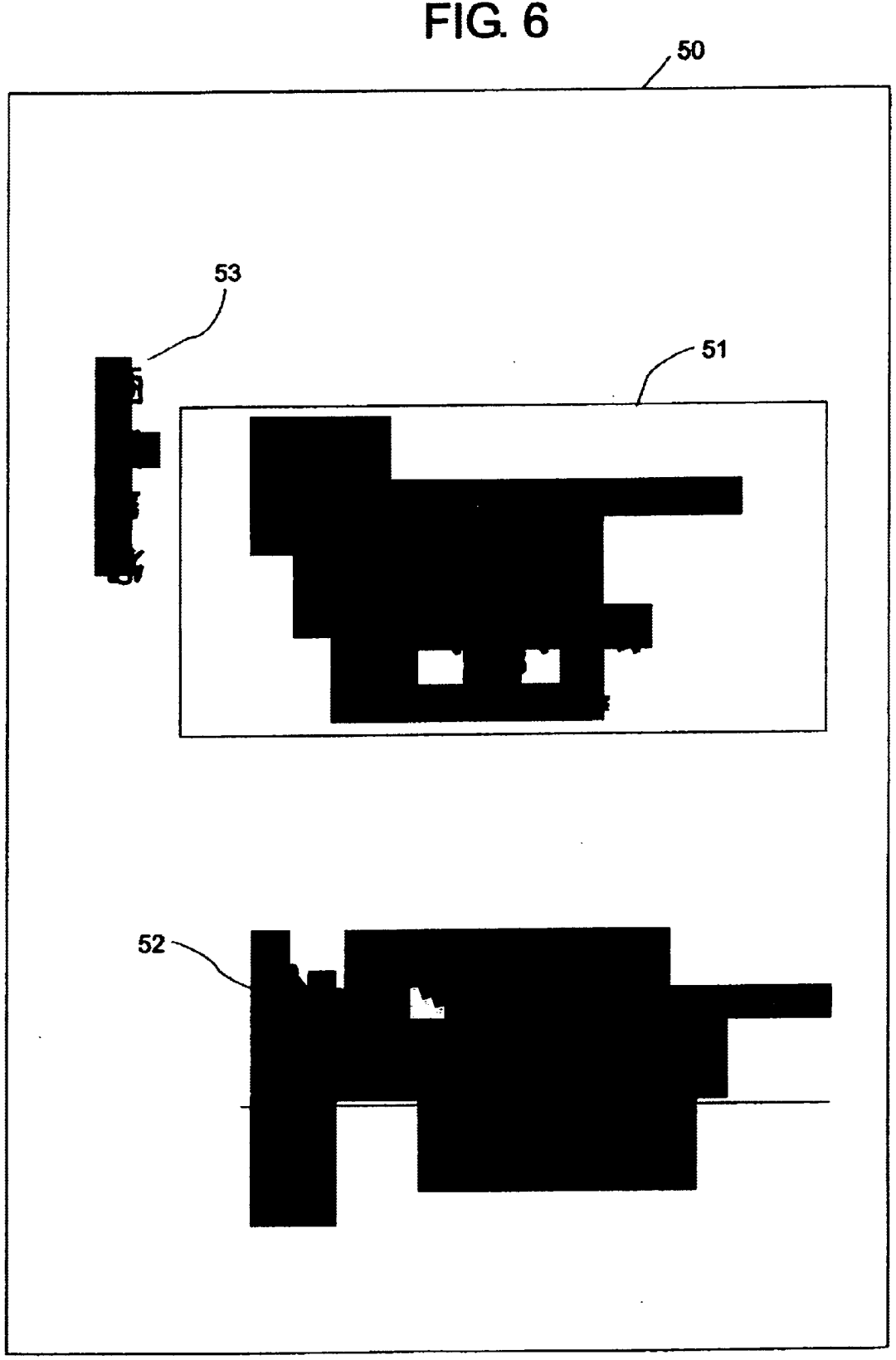
FIG. 6 is a diagram showing the existing state when the mesh images in the first example are assembled and set to the ON state.
Figure 7:
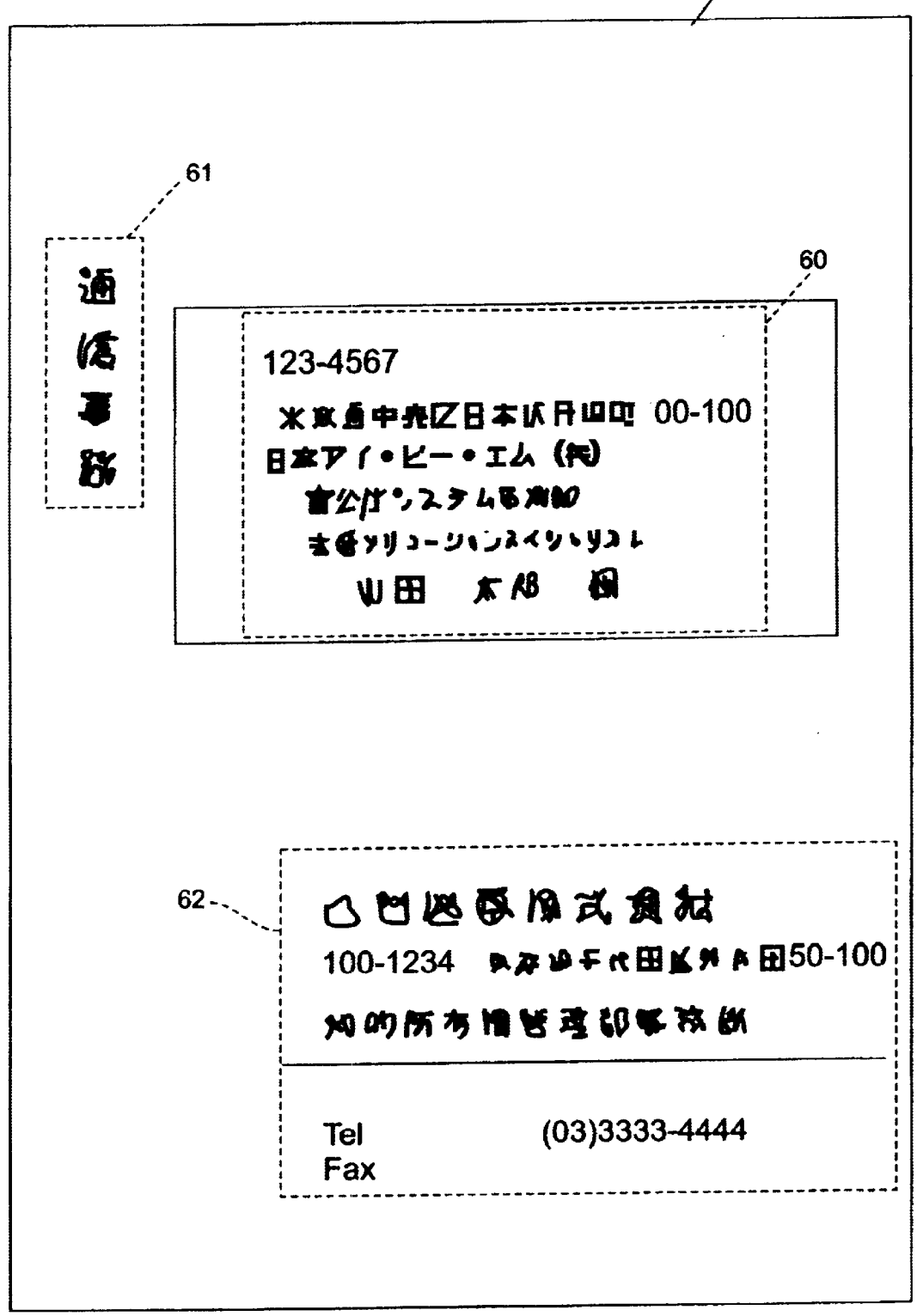
FIG. 7 is a diagram showing probable address areas extracted in the first example.
Figure 8:
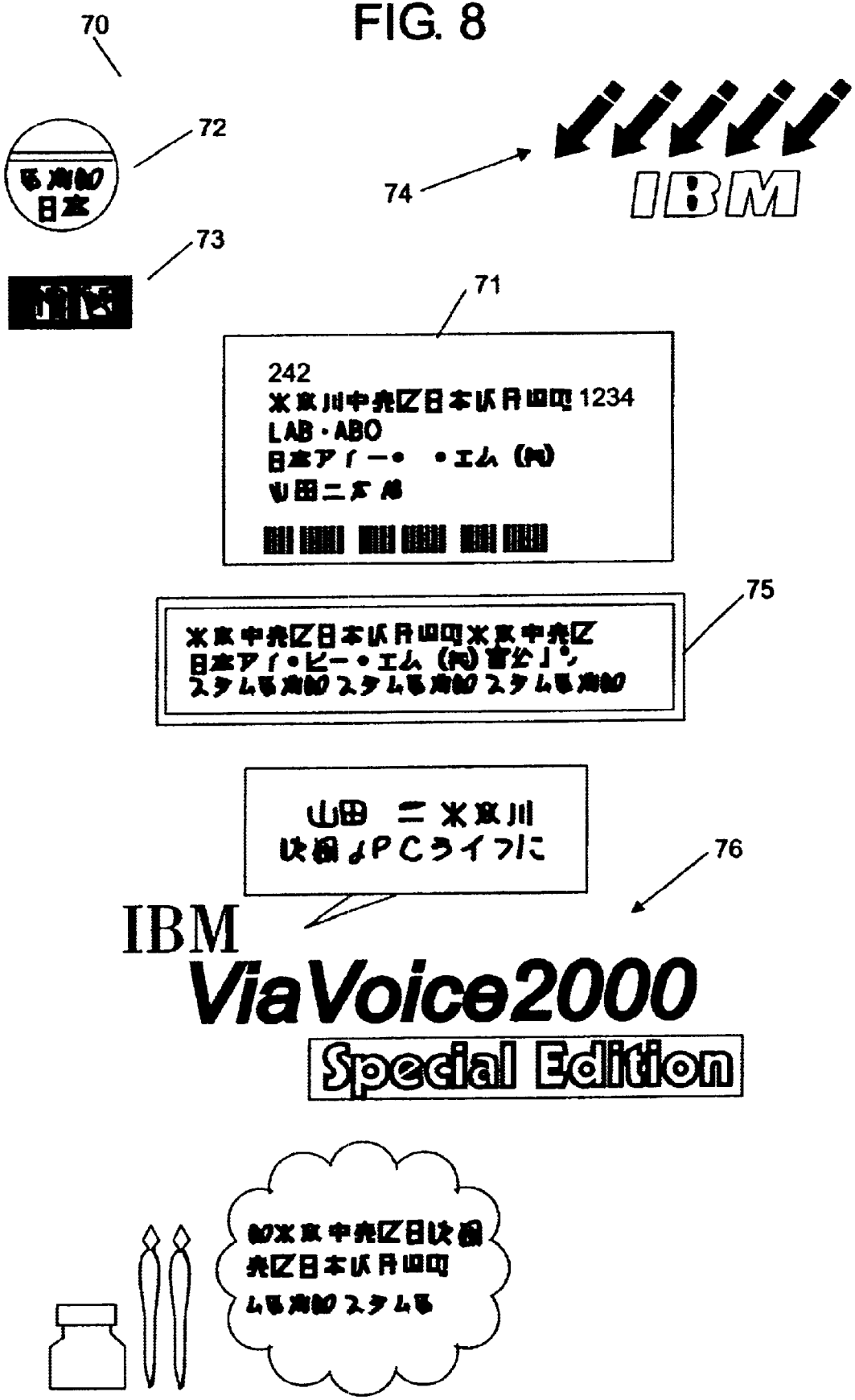
FIG. 8 is a diagram showing the original image for a second practical example.
Figure 9:
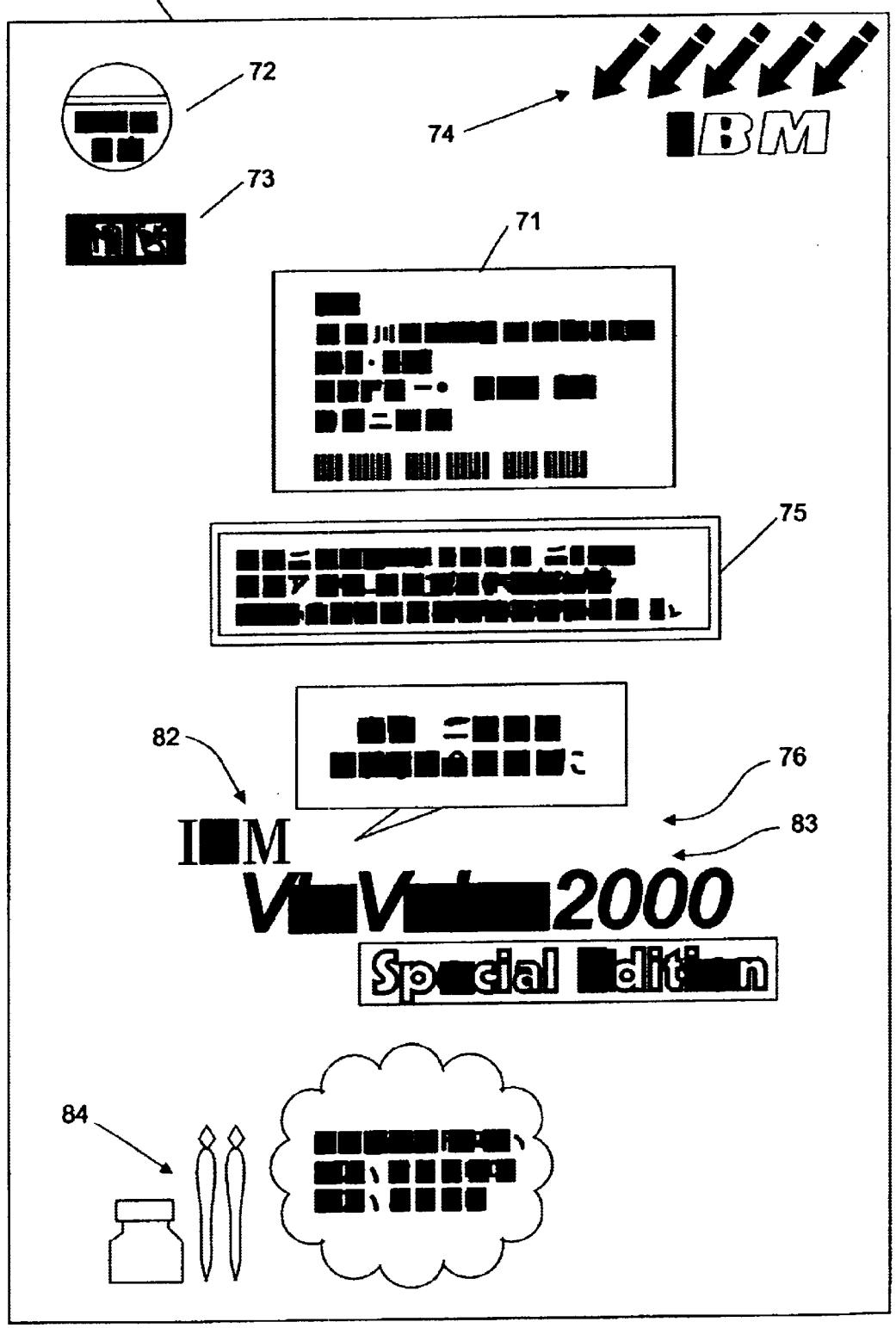
FIG. 9 is a diagram showing the existing state in the second practical example when character-sized connected components (CharCCs) are extracted.
Figure 10:
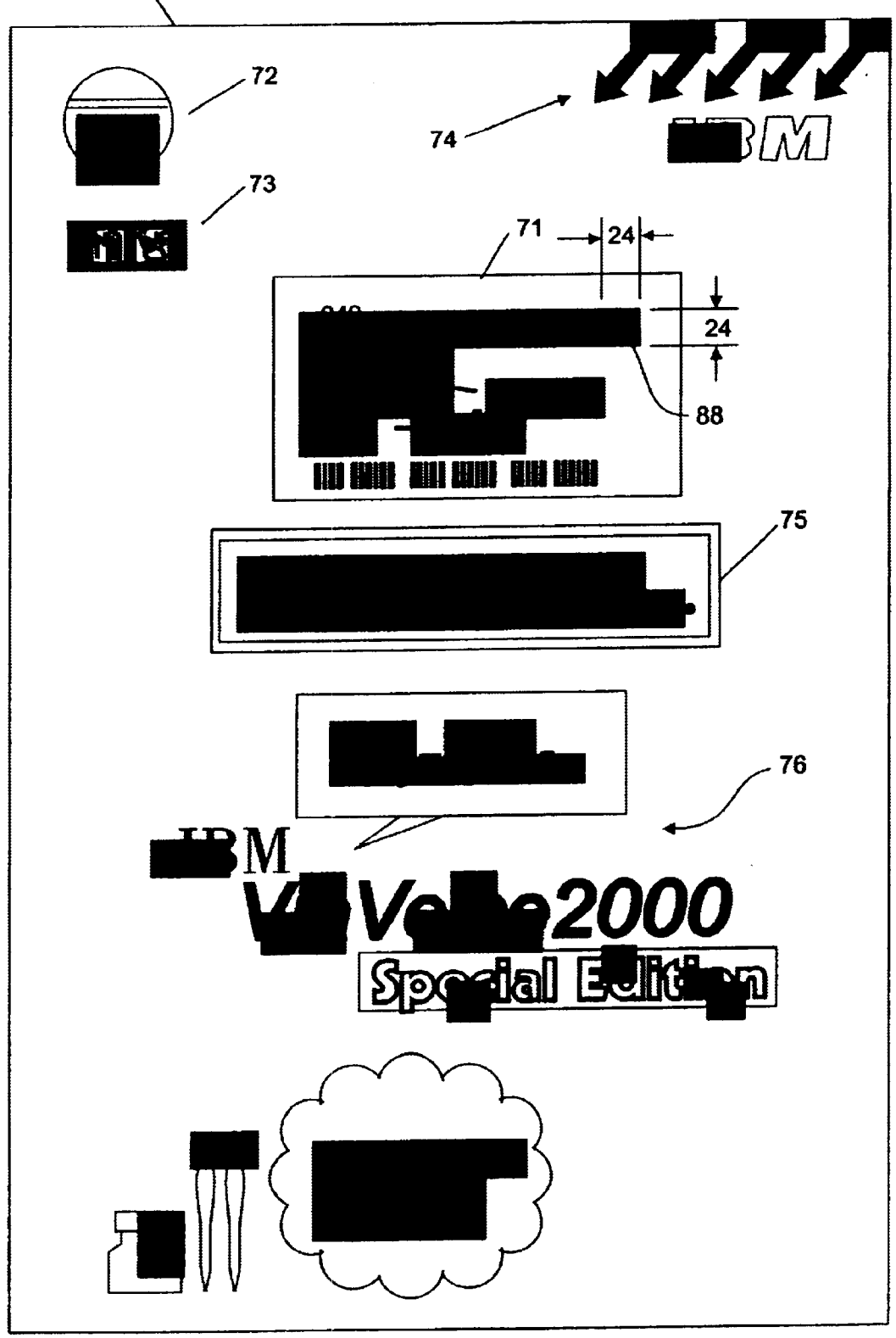
FIG. 10 is a diagram showing the existing state in the second example when mesh images are set to the ON state.
Figure 11:
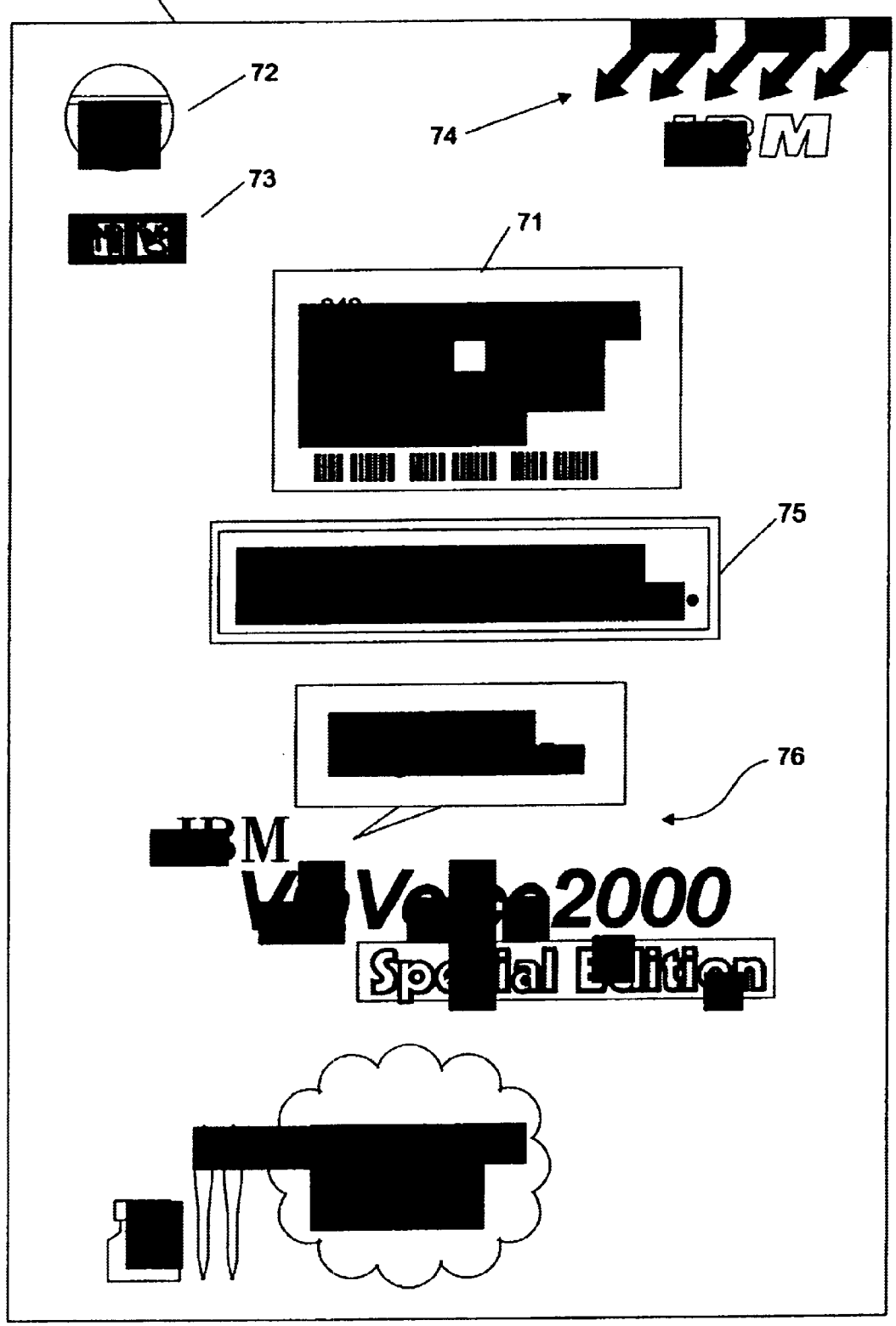
FIG. 11 is a diagram showing the existing state in the second example when the mesh images are assembled and set to the ON state.
Figure 12:
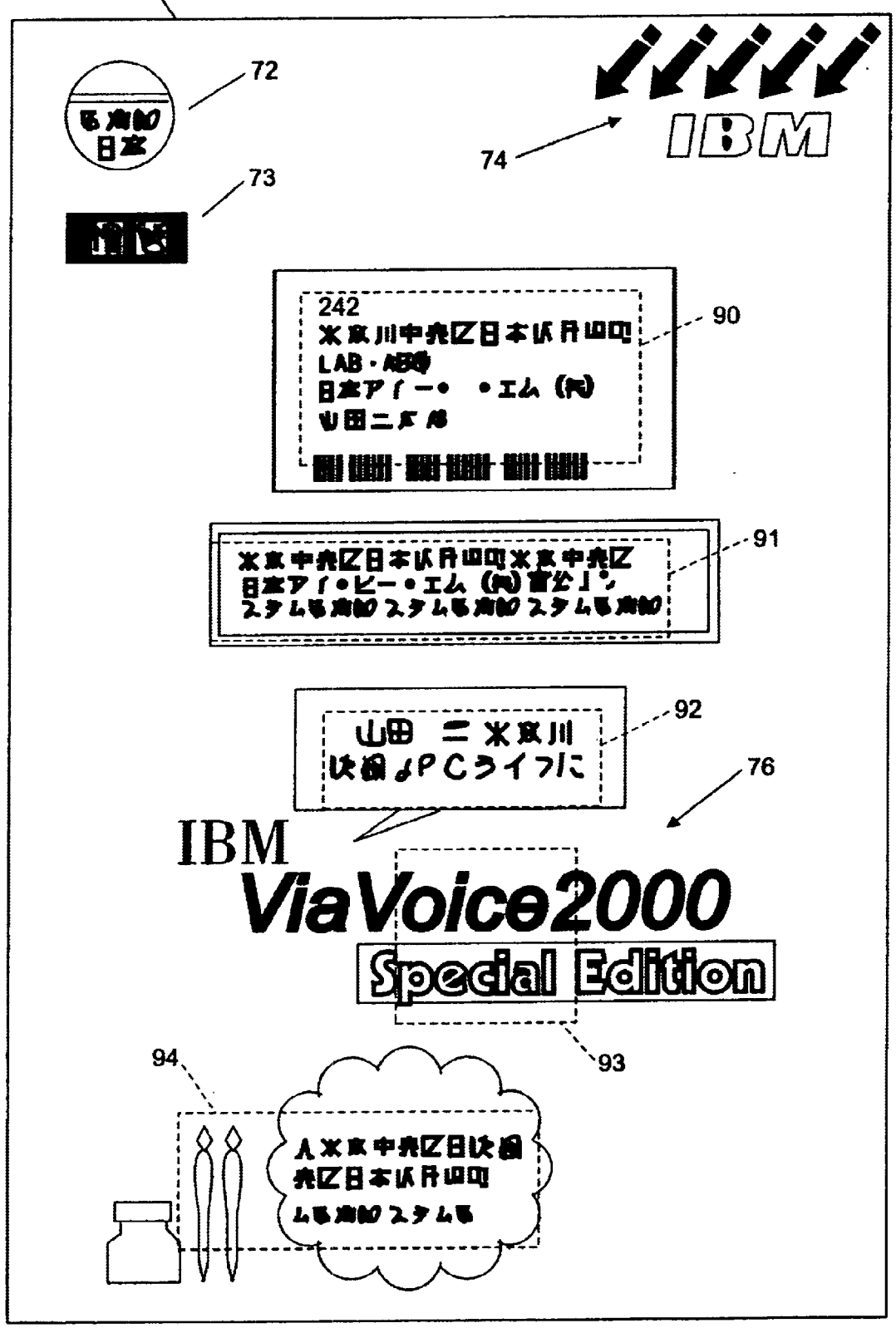
FIG. 12 is a diagram showing probable address areas that are extracted in the second example.
Figure 13:
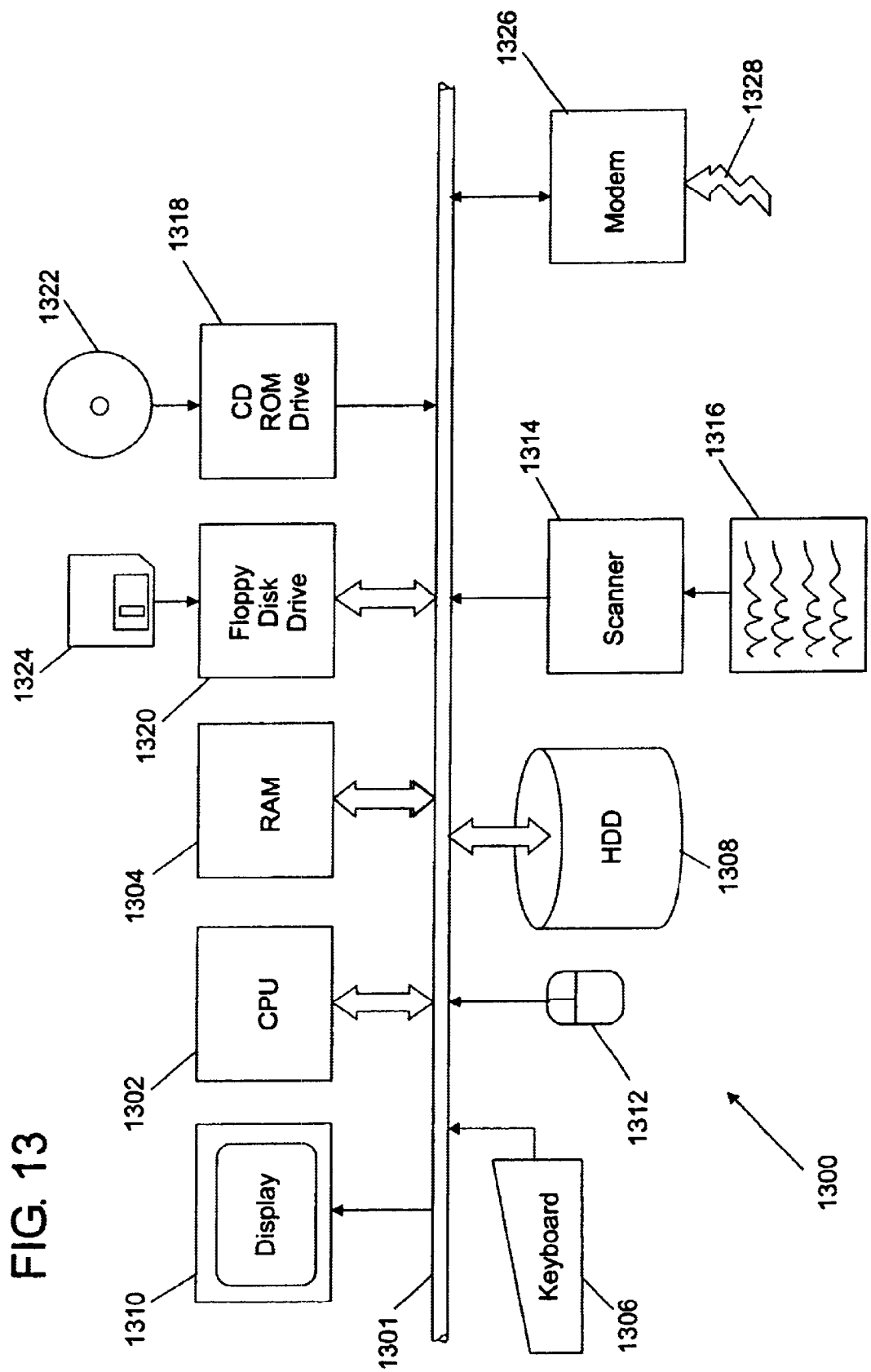
FIG. 13 is an example of a computer system that can be used with the present invention.

The mail address reading processing performed in the embodiment will now be described while referring to FIGS. 1 to 12. FIG. 2 is a flowchart for explaining the main mail address reading process performed in this embodiment. FIGS. 3 to 12 are diagrams showing, as first and second practical examples, the condition (FIG. 4 or 9) where an original image (FIG. 3 or 8) or a character-sized connected component (CharCC) 17 is extracted, the condition (FIG. 5 or 10) where a mesh image is set to the ON state, the condition (FIG. 6 or 11) where an assembled mesh image is set to the ON state, or the extraction of a probable address area (FIG. 7 or 12). First, mail is scanned by the image input device 10 (step 101). In FIG. 3, address information 51, sender information 52 and correspondence information 53 are written on a piece of mail 50. In FIG. 8, various image information items, such as address information 71, separate printed postage paid information 72, distribution information 73, a trademark display 74, correspondence information 75 and printed background information 76, are written on the piece of mail 70. These image data are binarized by the binarization unit 12 using an appropriate method (step 102). The connected component detector 14 detects connected components (CCs) and stores them in a memory (not shown) (step 103). The comparator 16 compares the connected component (CC) with the threshold value stored in the threshold value storage unit 15, and extracts character-sized connected components (CharCCs) 17 having appropriate sizes (step 104). In FIGS. 4 and 9, the character-sized connected components (CharCCs) 17 are joined together to form a black rectangular shape, and are superimposed on the original image so they may be easily understood. In FIG. 4, almost all the characters in the address information 51, the sender information 52 and the correspondence information 53 are extracted as character-sized connected components (CharCCs) 17. It should be noted that a dot "•" 55 and a dash "-" 56 are not extracted because they do not satisfy the threshold condition. In FIG. 9, many character data are extracted, but the characters and the pattern in the trademark display 74, and a letter "M" 82 and numerals "2000" 83 contained in the printed background information 76 are excluded by regarding them as large characters that exceed 30 pixels. Further, a pattern 84 in which drawings of pens and an inkwell are featured is also excluded. It should be noted that a Chinese character "□□" 80 and a Chinese numeral "□□" 81 in the address information 71 are not extracted.

The corresponding mesh image detector 19 determines a simplified mesh image, which is a quadrilateral area assumed by the mesh image forming unit 18 and to which the center pixel of the character-sized connected component (CharCC) 17 belongs, and regards the determined mesh as a black mesh (step 105). As is shown in FIG. 5 or 10, the image is divided into meshes 58 or 88, which are small areas of 24×24 pixels, and the border line between the meshes 58 or 88 is not displayed. Since the dot "•" 55 and the dash "-" 56 in FIG. 4 are not extracted, a blank portion is present in a line in FIG. 5. Similarly, the character portions in which the dash "-" 56 is entered are blank in the address information 71 in FIG. 10. To interpolate this portion, the following process is performed. Specifically, in order to assemble meshes regardless of a one-row or a one-character gap, the mesh image connection detector 20 converts, into black meshes, white meshes sandwiched vertically or horizontally between black meshes (step 106). The results are shown in FIG. 6 or 11. As is apparent from a comparison with FIG. 5 or 10, regardless of the presence of a one-row or a one-character gap, the meshes are assembled and changed to black. Therefore, a probable address area can be understood as being a block constituted by a single connected mesh (CM).

The specific area extraction unit 22 regards one mesh as one pixel, and determines that a rectangular area enclosing an 8-connected component is a probable address area (step 107). The portions enclosed by broken lines in FIGS. 7 and 12 are those extracted at this step, and areas 60 to 62 and areas 90 to 94 correspond to probable address areas. It is understood that in FIG. 7 all the areas on the piece of mail 50 are selected as probable address areas, but that in FIG. 12 the separate printed postage paid information 72, the distribution information 73, the trademark display 74 and one part of the printed background information 76 are not selected. These information items are excluded from the probable address areas because a character string extends along only one row, or a satisfactory number of connected components (CCs) is not present. The character strings in the other areas are extracted, and various attributes are employed to evaluate the individual areas and rank them in order based on the probability that they are address areas (step 108). As is described above, the various attributes concern whether a character string is near the edge of an image and whether the shape of the character string has the appearance of an address. Through this process, in FIG. 7 area 60 is determined to be the first probable address area, area 62 the second, and area 61 the third; and in FIG. 12, beginning from the top, area 90 is determined to be the first probable address area, area 91 the second, area 92 the third, area 93 the fourth, and area 94 the fifth. Then, the image recognition device 23 performs address recognition for the areas in the descending order of their assigned priorities. When satisfactory results are obtained, the address recognition processing is terminated (step 109). Upon the completion of the above described processing, the address reading sequence for this embodiment is terminated.

A properly configured general purpose computer system, such as the one shown in FIG. 3, can be used with the present invention. Such a computer system 1300 includes a processing unit (CPU) 1302 connected by a bus 1301 to a random access memory 1304, a high density storage device 1308, a keyboard 1306, a display 1310 and a mouse 1312. Also attached to the CPU 1302 by the bus 1301, are a scanner 1314 for scanning documents 1316 to be analyzed into the computer 1300; and CD-ROM and magnetic disk drivers 1318 and 1320 for entry of information from optical; floppy magnetic disc mediums 1322 and 1324 containing the program code and data of the present invention; and a modem 1326 for receipt of electrical signals 1328.

As is described above, according to the present invention, using a simple algorithm a quadrilateral area containing an address area can be extracted from the surface of a piece of mail bearing an address area, a sender information area and various patterns. That is, since probable address areas are small relative to the size of a surface image, of a piece of mail, and patterns and noise can be removed from the image, and since whether character strings in the probable address areas are arranged vertically or horizontally can be predicted, an address recognition process can be performed for these probable address areas. As a result, the detection accuracy can be improved, the processing can be simplified, and the processing speed can be increased. With the algorithm used for this embodiment, the probability that an address area can be extracted is high, especially when the characters in the address area are machine printed. Further, a horizontally inscribed handwritten address, such as one used for mail received from western countries, can be precisely extracted.

Advantages of the Invention

As is described above, according to the present invention, a specific area, such as an address area, can be quickly and precisely extracted, while the necessity to perform a complicated joining process for pixels is rendered unnecessary.

Further, since several probable areas are extracted from which unwanted patterns and noise have been removed, the performance of the subsequent process can be greatly simplified.

What is claimed is:

1. An area extraction method comprising the steps of:

extracting connected components from an input image of mail that includes an address area;

comparing the sizes of said connected components with a predetermined threshold size, and extracting connected components occupying a size within a range of values in said predetermined threshold size;

dividing said input image into segments and assuming that said segments are mesh images having a predetermined size, and setting to the ON state said mesh images that correspond to said connected components occupying a size within a range of values in said predetermined threshold size that is extracted wherein sizes of said mesh images that are segments of said input image are determined to occupy ranges having sizes equal to the sizes of large characters in an assumed address area; and extracting a probable address area from the connectivity of said mesh images that are in the ON state.

2. The area extraction method according to claim 1, wherein at said step of setting said mesh images to the ON state, a mesh image that includes the center coordinates of said connected components occupying ranges within said predetermined threshold size is set to the ON state.

3. An image processing apparatus comprising:

an image input unit for entering an image of mail, including an address;

a binarization unit for obtaining a binary image for said image entered by said image input unit;

a connected component detector for detecting connected components obtained by said binarization unit;

a comparator for comparing the size of said connected components detected by said connected component detector with a predetermined threshold size, wherein said threshold size used by said comparator is determined in accordance with a size that is assumed for a character in the address;

a mesh image forming unit for dividing said image entered by said image input unit into mesh images having a predetermined size;

a corresponding mesh image detector for detecting, from said mesh images formed by said mesh image forming unit, a mesh image that corresponds to a connected component that is determined by said comparator to occupy a range within said threshold size;

a specific area extraction unit for extracting a specific area in accordance with the connection state of said corresponding mesh image that is detected by said corresponding mesh image detection unit; and an image recognition unit for recognizing an image that is located in said specific area extracted by said specific area extraction unit.

4. The image processing apparatus according to claim 3, wherein said predetermined size for said mesh images is determined based on the size of an address.

5. A computer program product on a carrying medium for use with a computer for providing an area extraction method comprising:

software for extracting connected components from an input image of mail that includes an address;

comparing the sizes of said connected components with a predetermined threshold size, and extracting connected components occupying a size within a range of values in said predetermined threshold size by comparing the height and/or width of said connected components with a predetermined height and/or width of a character at an assumed address;

software for dividing said input image into segments and assuming that said segments are mesh images having a predetermined size, and setting to the ON state said mesh images that correspond to said connected components occupying a size within a range of values in said predetermined threshold size that is extracted; and extracting a specific area as a probable address area from the connectivity of said mesh images that are in the ON state.

6. The area extraction method according to claim 5, wherein in said software or setting said mesh images to the ON state, a mesh image that includes the center coordinates of said connected components occupying ranges within said predetermined threshold size is set to the ON state.

7. An area extraction method comprising the steps of:

extracting connected components from an input image of mail that includes an address area;

comparing the sizes of said connected components with a predetermined threshold size, and extracting connected components occupying a size within a range of values in said predetermined threshold size by comparing the height and/or width of said connected components with a predetermined height and/or width of a character in an assumed address area;

dividing said input image into segments and assuming that said segments are mesh images having a predetermined size, and setting to the ON state said mesh images that correspond to said connected components occupying a size within a range of values in said predetermined threshold size that is extracted; and extracting a specific probable address area from the connectivity of said mesh images that are in the ON state.

8. An image processing apparatus comprising:

an image input unit for entering an image;

a binarization unit for obtaining a binary image for said image entered by said image input unit;

a connected component detector for detecting connected components obtained by said binarization unit;

a comparator for comparing the size of said connected components detected by said connected component detector with a predetermined threshold size;

a mesh image forming unit for dividing said image entered by said image input unit into mesh images having a predetermined size which is determined based on the size of said connected components detected by said connected component detector;

a corresponding mesh image detector for detecting, from said mesh images formed by said mesh image forming unit, a mesh image that corresponds to a connected component that is determined by said comparator to occupy a range within said threshold size;

a specific area extraction unit for extracting a specific area in accordance with the connection state of said corresponding mesh image that is detected by said corresponding mesh image detection unit; and an image recognition unit for recognizing an image that is located in said specific area extracted by said specific area extraction unit.

9. A computer program product on a carrying medium for use with a computer for providing an area extraction method comprising:

software for extracting connected components from an input image of mail that includes an address;

comparing the sizes of said connected components with a predetermined threshold size, and extracting connected components occupying a size within a range of values in said predetermined threshold size;

software for dividing said input image into segments and assuming that said segments are mesh images having a predetermined size, and setting to the ON state said mesh images that correspond to said connected components occupying a size within a range of values in said predetermined threshold size that is extracted wherein sizes of said mesh images that are segments of said input image that are determined to occupy ranges having sizes equal to the sizes of large characters in an area that is assumed to be an address area; and extracting a specific area as a probable address area from the connectivity of said mesh images that are in the ON state.

* * * * *